Sept. 12, 1939.  T. E. NELSON  2,173,075

OIL SEAL

Filed Aug. 13, 1937

INVENTOR.
Thomas Edward Nelson
BY
ATTORNEY.

Patented Sept. 12, 1939

2,173,075

UNITED STATES PATENT OFFICE 2,173,075

OIL SEAL

Thomas Edward Nelson, Pontiac, Mich.

Application August 13, 1937, Serial No. 158,975

1 Claim. (Cl. 286—11)

This invention relates to oil seals and the object of the invention is to provide an oil seal of resilient material, such as rubber, composition cork, or equivalent material of a type to have an inherent yieldability in order to properly seal.

A further object of the invention is to provide an oil seal positioned between a stationary housing and a rotating member in which the sealing member is made of a yieldable resilient material having flat sealing faces and comprising two ring portions connected together by an annular portion substantially V-shaped in cross section which may yield or expand as the mounting requires.

A further object of the invention is to provide an annular oil seal member made entirely of composition rubber, composition cork, or equivalent material, arranged to be positioned between a stationary face and a rotating face extending transversely to the axis of the annular oil seal and arranged so that the inherent resiliency or expandability of the annular member maintains the sealing faces in engagement with the stationary and rotating members.

Another object of the invention is to provide an annular oil seal composed substantially of a pair of ring portions connected by an intermediate portion substantially V-shaped in cross section, in which the V portion has a tendency to widen out or expand and maintain the flat sealing faces on the outer sides of the ring portions in engagement with the members being sealed.

A further object of the invention is to provide an annular oil seal in which one face seals against a rotating member and the other face seals against a stationary housing while the inner edge of one portion of the seal fits close about a rotating hub or shaft to prevent dirt entering the seal between the hub or shaft and the seal.

These objects and the several novel features of the invention are hereinafter more fully described and claimed and the preferred form of construction by which these objects are attained is shown in the accompanying drawing in which—

Figure 1:
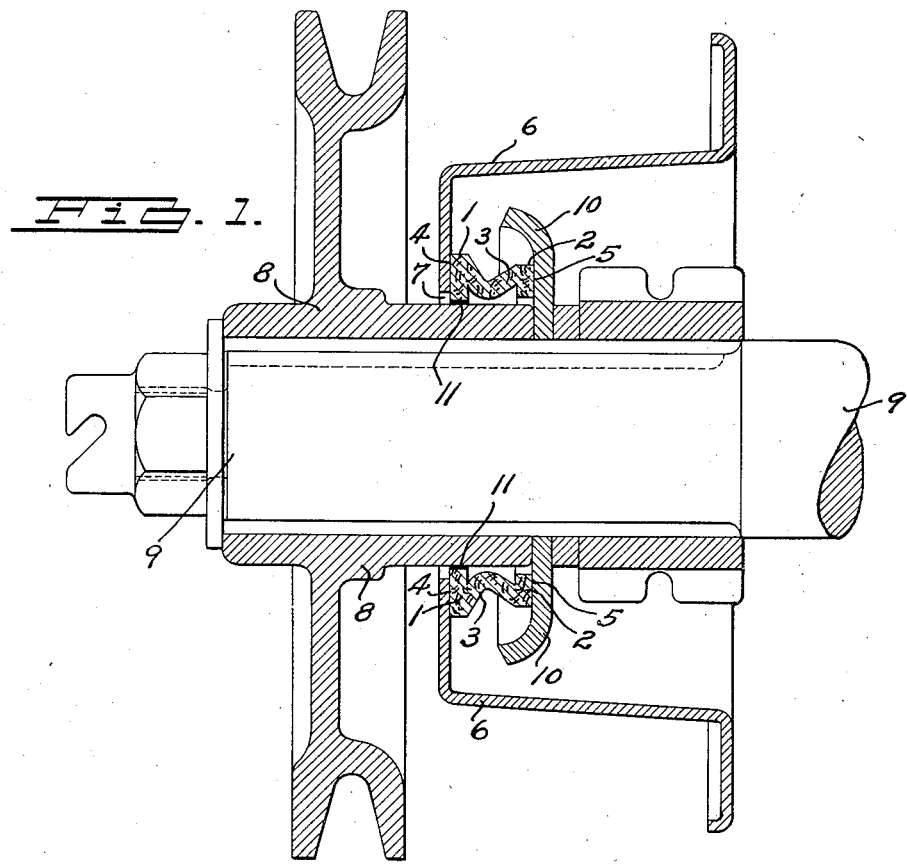
Fig. 1 is a vertical section through an oil seal embodying my invention and showing one type of installation on the front end of an automobile engine.
Figure 2:
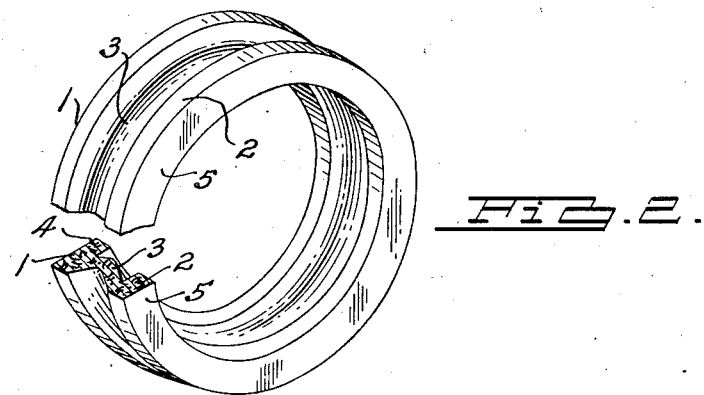
Fig. 2 is a perspective view of the oil seal.

The oil seal is shown more particularly in Fig. 1 and comprises a ring portion 1 and a ring portion 2 connected by an integral intermediate substantially V-shaped portion 3. The outer face 4 of the ring portion 1 extends transversely to the axis of the ring while the outer portion 5 of the ring portion 2 also extends transversely to the axis of the ring. The face 4 seals against the stationary housing 6 which is provided with clearance at 7 about the hub 8 of a fan belt pulley. This fan belt pulley is secured to rotate with the shaft 9 and an oil slinger flange 10 is also secured to rotate with the shaft 9. The oil slinger flange 10 is designed particularly so that any oil reaching this flange 10 is thrown outwardly by centrifugal force against the wall of the stationary housing 6 and will be drained back into the engine.

The installation shown is on the front end of an automobile engine though, of course, there are a great many other installations where this oil seal is equally effective. The face 5 of the ring portion 2 seals against the face of the rotating oil slinger flange 10 and upon installation the oil seal is compressed slightly between the face of the housing 6 and the face of the oil slinger flange 10 so that the inherent resiliency or yieldability of the connecting V-shaped portion 3 will tend to spread the ring portions 1 and 2 apart and maintain sealing engagement against the stationary housing 6 and rotating flange 10.

The ring portion 1 fits quite closely about the hub 8 at the point 11 but not sufficiently close as to produce friction at this point. The object here is to prevent dirt or other foreign matter from working along the hub into the oil seal. The seal may be made of any suitable material such as a composition rubber, composition cork, synthetic rubber, or some of the newer oil proof rubbers which have been developed for use in installations where the rubber becomes covered with oil. When the seal has been compressed and installed as shown in Fig. 1, the tendency of the V-shaped portion 3 to expand maintains the seal between the stationary and rotating faces and it will be noted that the portion of the face 4 in contact with the housing 6 is greater than the portion of the face 5 in contact with the flange 10 and consequently the seal will normally tend to remain stationary as there is no frictional contact at the point 11 between the seal and the hub 8. However, the seal may turn to some extent in adjusting itself in position without interfering with the sealing action.

From the foregoing description it becomes evident that the device is very simple and efficient in operation, comprises a single unit formed of one integral piece of composition material molded to form which may be readily installed and provides a device which accomplishes the objects described.

Having thus fully described my invention, its utility and mode of operation, what I claim and desire to secure by Letters Patent of the United States is—

An oil seal for use between a stationary flat surface and a rotating flat surface, comprising an annular member formed of resilient composition material and being M-shaped in cross section, one leg of the M-shaped annular member being longer than the other and the annular member being positioned between the stationary flat surface and the rotating flat surface so that the outer surfaces of the annular member bear against these surfaces and are slightly compressed therebetween, the longer leg of the M-shaped member engaging against the stationary flat surface and the shorter leg engaging against the rotating flat surface so that the annular member tends to remain stationary in position while the rotating flat surface moves in relation thereto.

THOMAS EDWARD NELSON.